Dec. 11, 1934.  H. C. KROHN  1,984,272
FISHING APPARATUS
Filed Feb. 1, 1933
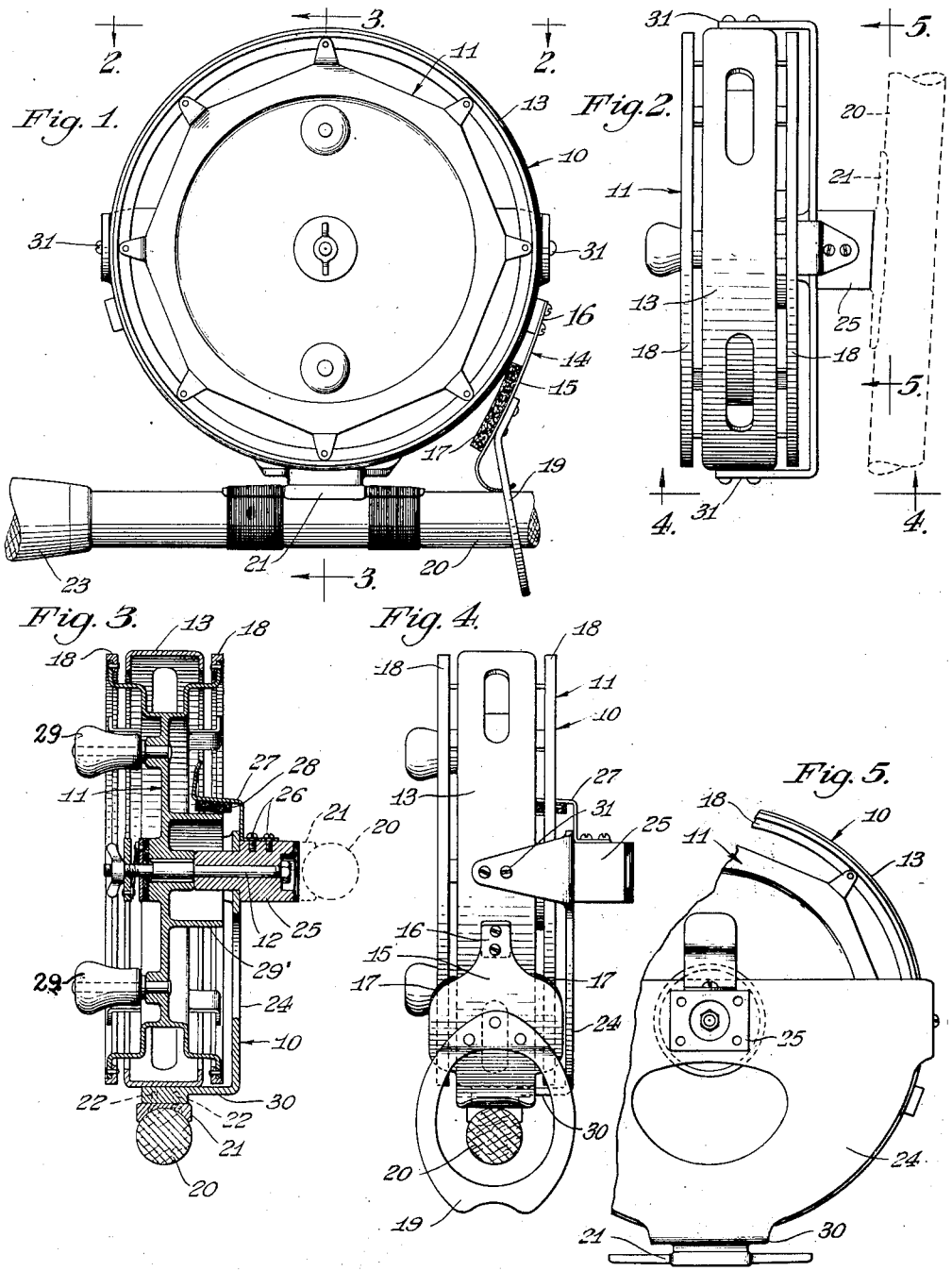
Herman C. Krohn
INVENTOR
BY Victor J. Evans & Co.
HIS ATTORNEYS Patented Dec. 11, 1934

1,984,272

UNITED STATES PATENT OFFICE 1,984,272

FISHING APPARATUS

Herman C. Krohn, Oak Park, Ill.

Application February 1, 1933, Serial No. 654,717

2 Claims. (Cl. 242—84.5)

This invention relates to certain novel improvements in fishing apparatus.

An object of this invention is to provide in a fishing apparatus, a novel form of line drag or brake for a reel and a mounting for attaching a pole to the reel either at the bottom or at the side of the reel and in position for use by either a right-handed or left-handed person.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a side elevational view of the new apparatus showing the same in position for use by a right-handed person;

Fig. 2 is a top plan view of the new apparatus, on line 2—2 in Fig. 1;

Fig. 3 is a sectional view on line 3—3 in Fig. 2;

Fig. 4 is an end elevational view on line 4—4 in Fig. 2; and

Fig. 5 is a fragmentary side elevational view on line 5—5 in Fig. 2.

The new apparatus is indicated generally at 10 and includes a conventional drum or reel which is generally indicated at 11 which is rotatably mounted upon a pintle or shaft 12 in a guard or cage that is generally indicated at 13.

An important feature of the new apparatus is the reel drag generally indicated at 14 and comprising a brake member which includes a resilient flat metal strip 15 attached at one end to the guard 13 at a point 16 on the circumferential periphery of the guard 13. Carried by this strip 15 is a pair of brake or drag shoes 17. Attached to the strip 15 at a point on the circumferential periphery of the reel is a loop 19 through which the pole 20 may be projected when in use so that by holding the pole 20 and squeezing the finger grip loop 19 toward the cage 13 the brake shoes 17 may be manipulated into braking engagement with opposite flanges 18 of the drum or reel 11.

For attaching the apparatus to a pole 20 I provide a mounting in the form of a bracket 21. This mounting is detachably attachable by screws 22 to an arm 30 of a bracket 24 which is attached to the cage 13, as at 31, so that the mounting 21 is at the bottom of the apparatus, as shown in Figs. 1, 3 and 5. The handle of the pole is indicated at 23 and the apparatus may be positioned on the pole 20 so as to be in position for use by a right-handed person or which may be reversed for use by a left-handed person, as desired.

For attaching the pole 20 to the side of the new apparatus, along the axis of the reel 11 and at the lateral side thereof, I mount a block 25 on the bracket 24. The mounting 21 is detachably attachable to the block 25 by means of the screws 22, or the like, in the dotted line position of Figs. 2 and 3. Attached to the block 25 at 26 is a resilient metal strip 27 to which is attached a line drag or brake shoe 28. This brake shoe 28 may be manipulated or pressed into braking engagement with the hub 29 of the reel 11 when using the apparatus with the pole 20 attached to the side thereof, as in dotted lines, Figs. 2 and 3. This position is often found more convenient in fishing than the position in which the pole is attached to the apparatus at the bottom thereof, and an important element of the present invention is the novel feature of the mounting 21 which is selectively and interchangeably attachable to the guard or cage braket 24 at either the side or the bottom of the apparatus 10. The reel 11 is provided with two knobs 29 arranged to permit manual operation of the reel.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In fishing apparatus, a rotatable line reel, a guard about the same for attachment to a pole disposed between the sides of the reel, means for rotatably connecting the line reel with said guard, a mechanism for dragging the peripheral edges of the reel sides including a brake member attached to the guard, and a finger grip connected with said brake member for manipulating the brake member in the form of a loop adapted to have the pole projected therethrough in use.

2. In a fishing apparatus comprising a frame for attachment to a fish pole, means for detachably connecting the frame with the pole, a flanged drum for supporting a fish line, a bearing for rotatably connecting the drum with said frame, said frame being positioned between the flanges of said drum, a grip connected with one side of the drum, said means being so constructed and arranged as to permit reversal of the frame and the drum with respect to the pole, to make the grip available to right- or left-handed users, a drag brake carried by said frame, said drag brake comprising two friction elements arranged in operative relation with the flanges of said drum, and a trigger associated with said drag brake and having an opening to receive the fish pole.

HERMAN C. KROHN.